US008825626B1

(12) United States Patent
Wallace et al.

(10) Patent No.: US 8,825,626 B1
(45) Date of Patent: Sep. 2, 2014

(54) METHOD AND SYSTEM FOR DETECTING UNWANTED CONTENT OF FILES

(75) Inventors: Grant Wallace, Pennington, NJ (US); Philip N. Shilane, Yardley, PA (US); Frederick Douglis, Basking Ridge, NJ (US)

(73) Assignee: EMC Corporation, Hopkinton, MA (US)

( * ) Notice: Subject to any disclaimer, the term of this patent is extended or adjusted under 35 U.S.C. 154(b) by 82 days.

(21) Appl. No.: 13/216,020

(22) Filed: Aug. 23, 2011

(51) Int. Cl.
*G06F 17/30* (2006.01)

(52) U.S. Cl.
USPC ........... 707/709; 707/747; 707/697; 707/698; 707/699

(58) Field of Classification Search
CPC . G06F 12/1408; G06F 21/64; G06F 11/1453; G06F 21/32
USPC .......................... 707/709, 747, 697, 698, 699
See application file for complete search history.

(56) References Cited

U.S. PATENT DOCUMENTS

| 6,745,194 | B2 | 6/2004 | Burrows |
| 7,567,188 | B1* | 7/2009 | Anglin et al. ........... 707/999.202 |
| 7,634,147 | B2* | 12/2009 | Neogi ............................ 382/245 |
| 7,814,149 | B1* | 10/2010 | Stringham .................... 707/758 |
| 8,010,705 | B1 | 8/2011 | Sebastian et al. |
| 8,171,063 | B1* | 5/2012 | Janakiraman et al. ........ 707/822 |
| 8,214,517 | B2* | 7/2012 | Dubnicki et al. ............. 707/693 |
| 8,234,468 | B1* | 7/2012 | Deshmukh et al. ........... 711/162 |
| 8,474,038 | B1* | 6/2013 | Wong ............................... 726/22 |
| 8,508,389 | B2 | 8/2013 | McCanne et al. |
| 2005/0091234 | A1* | 4/2005 | Hsu et al. ...................... 707/100 |
| 2005/0131939 | A1 | 6/2005 | Douglis et al. |
| 2006/0013451 | A1 | 1/2006 | Haitsma |
| 2008/0256326 | A1 | 10/2008 | Patterson et al. |
| 2008/0270729 | A1 | 10/2008 | Reddy et al. |
| 2009/0019547 | A1* | 1/2009 | Palliyil et al. .................... 726/25 |
| 2011/0035805 | A1* | 2/2011 | Barkan et al. ................. 707/736 |
| 2011/0040732 | A1 | 2/2011 | Anglin et al. |
| 2011/0055471 | A1* | 3/2011 | Thatcher et al. .............. 711/114 |
| 2011/0125720 | A1* | 5/2011 | Jayaraman .................... 707/692 |
| 2012/0089578 | A1 | 4/2012 | Lam |
| 2012/0159175 | A1* | 6/2012 | Yocom-Piatt et al. ........ 713/176 |
| 2012/0215853 | A1* | 8/2012 | Sundaram et al. ............ 709/206 |
| 2013/0041872 | A1* | 2/2013 | Aizman et al. ................ 707/690 |

OTHER PUBLICATIONS

Broder, Andrei Z., "On the resemblance and containment of documents," in Compression and Complexity of Sequences, Sequences '97, IEEE, 1997, 9 pages.
Non-Final Office Action, U.S. Appl. No. 13/216,013, dated Feb. 26, 2013, 17 pages.

(Continued)

*Primary Examiner* — Rehana Perveen
*Assistant Examiner* — Tiffany Thuy Bui
(74) *Attorney, Agent, or Firm* — Blakely Sokoloff Taylor Zafman LLP

(57) ABSTRACT

Techniques for detecting unwanted data are described herein. In one embodiment, a request is received for storing a data object in a storage system from a client over a network, where the request includes first representative data representing the data object without including actual content of the data object. It is detected whether the data object contains unwanted content by comparing the first representative data with second representative data without accessing the actual content of the data object, where the second representative data represents the unwanted content. A response is transmitted to the client over the network indicating whether the data object is likely to contain the unwanted object based on comparison of the first and second representative data.

17 Claims, 10 Drawing Sheets

(56) References Cited

OTHER PUBLICATIONS

Final Office Action, U.S. Appl. No. 13/216,013, dated Jun. 4, 2013, 14 pages.

Notice of Allowance, U.S. Appl. No. 13/216,013, dated Feb. 10, 2014, 17 pages.

Non-Final Office Action, U.S. Appl. No. 13/216,013, dated Oct. 4, 2013, 15 pages.

* cited by examiner

METHOD AND SYSTEM FOR DETECTING UNWANTED CONTENT OF FILES

RELATED APPLICATIONS

This application is related to U.S. patent application Ser. No. 13/216,013, entitled "Method and Apparatus for Efficiently Searching Data in a Storage System," filed Aug. 23, 2011.

FIELD OF THE INVENTION

Embodiments of the present invention relate generally to data storage systems. More particularly, embodiments of the invention relate to detecting unwanted data to be stored in a data storage system.

BACKGROUND

In modern computer systems, a file system stores and organizes computer files to enable a user to efficiently locate and access requested files. File systems may utilize a storage device such as a hard disk drive to provide local access or provide access to data stored on a remote file server. A file system can also be characterized as a set of abstract data types that are implemented for the storage, hierarchical organization, manipulation, navigation, access, and retrieval of data. The file system software is responsible for organizing files and directories.

Typically, to search a file, a file search function is utilized. Given a search term such as a file name, a file extension, or an update time, the file search function can find a file that matches the term from a file system. The file search function is provided in most operating systems and is advantageous in that a flexible search for an objective file can be conducted by changing a search term. However, in a large storage system such as a backup storage system, such a search can consume a long period of time, as the file search function has to search and compare each and entire content file in the storage system. Similarly, antivirus or malware software looking for signatures of target files in the storage system may also consume considerable resources.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
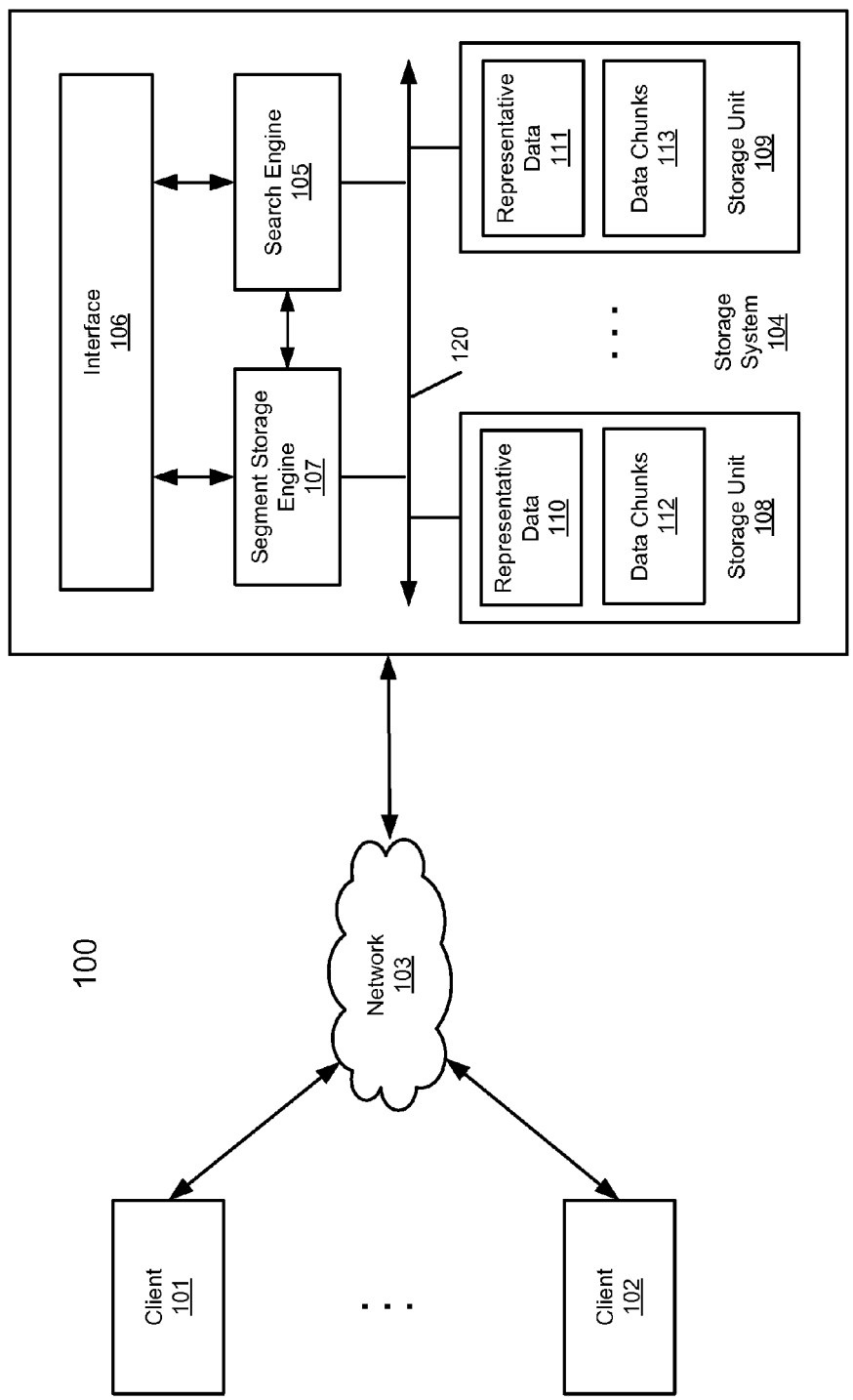
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a mechanism is provided to search a data object stored in a data storage system based on representative data representing the data object. The search is performed by matching representative data representing a target data object against the representative data of data objects stored in the data storage system to determine the likelihood that the target data object is stored in the data storage system. Such a search operation can be performed in an efficient manner without having to access the actual content of the data objects stored in the data storage system.

In one embodiment, a data storage system is a deduplicated storage system having one or more storage units. Each of the storage units is configured to store data chunks that are deduplicated within each of the storage units, where the files stored in the storage system are comprised of the data chunks. Each data chunk is formed through a specific policy, e.g. by breaking a file based on properties of the content in the file, which permits changes to one chunk without affecting the boundaries or contents of other chunks. Each data chunk is associated with a fingerprint (e.g., representative data) representing the data chunk. A fingerprint contains data (e.g., a hash value) that uniquely identify a data object. Requests can then be made to determine if file content exists on the storage system that is similar or identical to a known file of interest (i.e. a target file).

When a request is received for searching a target file in the storage system, the target file is partitioned into one or more data chunks. Fingerprints of at least some of the chunks are generated and compared with fingerprints of the data chunks stored in the storage system. If a certain number of fingerprints match, it is likely that the data chunks representing the target file being searched are stored in the storage system. Thereafter, the file or files of the data chunks in the storage system having matched fingerprints are further examined, for example, by comparing the actual content of the files, to confirm that the target file being searched is indeed stored in the storage system.

According to some embodiments, representative data (e.g., feature, fingerprint) can also be used to detect whether a data object or file contains certain unwanted content or data. In one embodiment, when a data object is received, prior to storing a data object in a storage system, representative data of the data object is obtained and compared with another representative data that represents certain unwanted content. Such a comparison is performed without having to scan or access the actual data object. If the representative data of the data object matches at least a portion of the representative data of the unwanted content, there is a chance that the data object may contain at least some of the unwanted content. The processing logic can then decide whether the data object should be stored in the storage system. If it is determined that the data object is unlikely to contain the unwanted content based on the comparison (e.g., the representative data do not match), the actual data object is then received and stored in the storage system. Thus, only the representative data is used to detect whether a data object likely contains unwanted content without scanning the actual data object. As a result, the efficiency of the detection is greatly improved. This is particularly helpful for a large scale data storage system that handles a huge amount of data from thousands of clients.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a de-duplication storage system available from EMC® Corporation of Hopkinton, Mass.

In one embodiment, storage system 104 includes, but is not limited to, interface 106, segment storage engine 107, and one or more storage units 108-109 communicatively. Storage units 108-109 may be implemented locally (e.g., single node operating environment) or remotely (e.g., multi-node operating environment) via interconnect 120, which may be a bus or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be stored in storage units 108-109, segment storage engine 107 is configured to segment the data file into multiple chunks according to a variety of segmentation policies or rules. Segment storage engine 107 only stores a chunk in a storage unit if the chunk has not been previously stored in the storage unit. In the event that a chunk has been previously stored, metadata stores information enabling the reconstruction of a file using the previously stored chunk. As a result, chunks of data files are stored in a deduplicated manner, either within each of storage units 108-109 or across at least some of storage units 108-109. In addition, metadata is added to at least some of storage units 108-109, such that files can be accessed independent of another storage unit. Data stored in the storage units may be stored in a compressed form (e.g., lossless compression: Huffman coding, Lempel-Ziv Welch coding; delta encoding: a reference to a chunk plus a difference; subsegmenting: a list of subsegments or references to subsegments, etc.). In one embodiment, different storage units may use different compressions (e.g., main or active storage unit from other storage units, one storage unit from another storage unit, etc.).

Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the metadata stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units).

In one embodiment, storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to this invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, in one embodiment, when data chunks of files such as data chunks 112-113 are stored in storage units 108-109, respectively, representative data associated with the data chunks are computed and stored in the storage units such as representative data 110-111. In one embodiment, representative data is computed for or extracted from each of the data chunks when the corresponding data chunks are stored in a storage unit. For example, the representative data 110-111 may be generated by a representative data generator (not shown) of segment storage engine 107 when the corresponding file or files are segmented and stored in any of storage units 108-109. In computing the representative data, a variety of data filtering techniques may be utilized to exclude certain bits (e.g., least significant bits) of the data to further improve the ability to identify target content. For example, the representative data may be computed using only a subset of bits of the data (e.g., most significant bits), thus changes to insignificant bits in the data do not prevent a match. This type of filtering of the target content is appropriate for some types of content (e.g. pictures or video). Note that representative data 110-111 may also be stored in a separate storage location (e.g., globally with respect to storage units 108-109) accessible by segment storage engine 107 and search engine 105, instead of being stored in individual ones of storage units 108-109.

Representative data may include a fingerprint of a data chunk. In one embodiment, a fingerprint may include a hash value computed based on the data chunk using a variety of hash algorithms, such as SHA-1 or MD5 hash algorithms. Alternatively, representative data may include one or more features extracted from the corresponding data chunk using a variety of feature extraction methods. Feature extraction involves simplifying the amount of resources required to describe a large set of data accurately. Feature extraction is a general term for methods of constructing combinations of the variables to get around these problems while still describing the data with sufficient accuracy. Furthermore, representative data may include a combination of a fingerprint and one or more features extracted from a corresponding data chunk.

According to one embodiment, storage system 104 includes search engine 105 communicatively coupled to interface 106 and segment storage engine 107. Search engine 105 is configured to allow a client such as clients 101-102 to search via interface 106 for a file stored in storage units 108-109 based on the representative data of the file. According to one embodiment, when search engine 105 receives a request for search a file that may be stored in storage units 108-109, the file may be partitioned into multiple chunks. Target representative data of each of the chunks is generated, which may be a fingerprint or a feature extracted from the corresponding chunk. Search engine 105 is then configured to search the target representative data in representative data 110-111. If the target representative data is found in representative data 110-111, there is likelihood that the file represented by the target representative data may be stored in storage units 108-109. Thereafter, a file or files of the matched representative data can then be further examined to confirm the file is indeed stored in storage units 108-109.

Note that throughout this application, a deduplicated storage system is utilized as an example of a data storage system. However, the techniques described throughout this application can also be applied to other types of non-duplicated storage system. Also note that a fingerprint is utilized as an example of representative data, however, other types of data such as a feature, signature, or pattern of data can also be applied. If data are transformed by filtering portions of content, a fingerprint of the transformed data will be distinct from the fingerprint used for deduplication and will be computed and stored separately.

Figure 2:
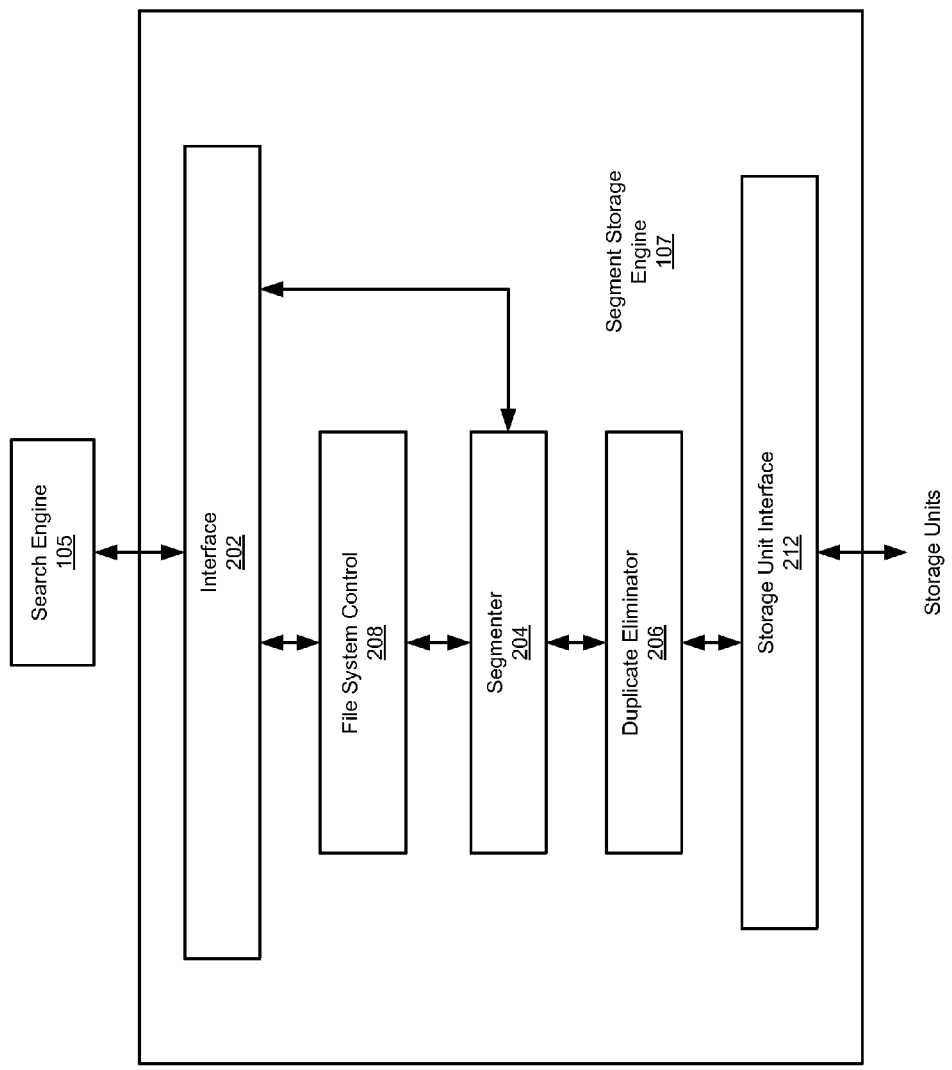
FIG. 2 is a block diagram illustrating a segment storage engine according to one embodiment of the invention.

FIG. 2 is a block diagram illustrating a segment storage engine according to one embodiment of the invention. Note that for purposes of illustration only, certain reference numbers for certain components having the same or similar functionalities from the previous figures or description may be retained the same. Referring to FIG. 2, in one embodiment, segment storage engine 107 includes interface 202, segmenter 204, duplicate eliminator 206, file system control 208, and storage unit interface 212. Segment storage engine 107 receives data item(s) (e.g., files) via interface 202. The data item(s) or file(s) is/are processed by segmenter 204 and file system control 208. Segmenter 204 partitions the data item(s) into segments based on a variety of rules or considerations. For example, the data item(s) may be broken into chunks by identifying chunk boundaries using a content-based technique (e.g., a function is calculated at various locations of a data item, when the function is equal to a value or when the value is a minimum, a maximum, or other value relative to other function values calculated for the data item), a non-content-based technique (e.g., based on data item property for example, byte length, title, creation date), or any other appropriate technique. In one embodiment, a chunk is restricted to a minimum and/or maximum length, to a minimum or maximum number of chunks per data item, or any other appropriate limitation.

In one embodiment, file system control 208 processes information to indicate the chunk(s) association with a data item. In some embodiments, a list of fingerprints is used to indicate chunk(s) associated with a data item. File system control 208 passes chunk association information to an index (not shown). The index is used to locate stored chunks in storage unit(s) via storage unit interface 212. Duplicate eliminator 206, which identifies whether a newly received chunk has already been stored in storage unit(s). In the event that a chunk has already been stored in storage unit(s), a reference to the previously stored chunk is stored instead of storing the newly received chunk.

Interface 202 is configured to receive a request to retrieve a data item. Interface 202 communicates with file system control 208 to identify appropriate chunks stored in storage units via storage unit interface 212. File system control 208 communicates with an index (not shown) to locate appropriate chunks stored in storage units via storage unit interface 212. Appropriate chunks are used to construct the requested data item. The data item is provided via interface 202 in response to the request. In one embodiment, file system control 208 utilizes a tree of content-based identifiers (e.g., fingerprints) to associate a file with data chunks and their locations in storage unit(s). In the event that a chunk associated with a given file or data item changes, the content-based identifiers will change and the changes will ripple from the bottom to the top of the tree associated with a file name (or directory structure) efficiently since the appropriate content-based identifiers are easily identified using the tree structure.

According to one embodiment, interface 202 is configured to allow search engine 105 to search a fingerprint or fingerprints of data chunks stored in storage units such as storage units 108-109 to determine the possibility and/or probability of a file stored in the storage system without having to scan the actual data chunks of the files. This can quickly determine the possibility or probability whether a target file is stored in the storage system since it does not require scanning entire files in the storage system. This is very helpful for a large scale of a storage system having thousands of files stored therein. Only if it is determined that the target file is likely stored in the storage system based on the search of its fingerprints, the associated data chunks having a matched fingerprint or at least one feature are then examined to confirm whether the target file is indeed found in the storage system.

When a request for searching a file is received by search engine 105, the target file is partitioned into chunks and a fingerprint is generated for each of the chunks. In one embodiment, search engine 105 can invoke, via interface 202, segmenter 204 to partition the file into multiple chunks, for example, using the same segmenting method (e.g., Rabin anchoring method) that is utilized to store the deduplicated data chunks in the storage system. For each of at least some of the chunks, search engine 105 can also invoke segmenter 204 to generate a fingerprint as part of target fingerprints representing the target file, for example, using the same fingerprint generation method (e.g., hash function such as SHA-1 or MD5) for the deduplicated data chunks stored in the storage system. In generating the target fingerprints, a variety of data filtering techniques may be utilized to exclude certain bits (e.g., least significant bits) of the data to further improve the accuracy of the comparison. For example, the target fingerprints may be computed using only a subset of bits of the data (e.g., most significant bits).

In one embodiment, representative data for the target file are sampled in order to generate a smaller set of representative data against which to compare the representative data within the storage system. For example, fingerprints of the target file could be compared to the fingerprints of the storage system only when a specified set of bits in a fingerprint are all set to 1. Such sampling further improves the efficiency of the comparison.

Based on the target fingerprints representing the target file, search engine 105 can search in a fingerprint or metadata store (e.g., representative data 110-111 of FIG. 1) to identify any fingerprint or fingerprints of deduplicated data chunks stored in the storage system that match the target fingerprints. If the fingerprints of the deduplicated data chunks are stored in the storage units (e.g., storage units 108-109 of FIG. 1), search engine 105 may go through segment storage engine 107 or a separate path to access storage units. Once the matched fingerprints are identified, the data chunks associated with the matched fingerprints are further examined to determine whether they match with chunks of the target file, which indicates that the target file is indeed stored in the storage system.

For example, it is assumed that the target fingerprints include N fingerprints and there are M fingerprints stored in the storage system that match. M fingerprints may represent data chunks of a large amount of files stored in the storage system. In one embodiment, the number of the matched fingerprints (e.g., M) is compared with a predetermined threshold. If the number of matched fingerprints is greater than the predetermined threshold, it can be considered that the target file is more likely than not stored in the storage system. Note that merely the fact that there are matched fingerprint does not guarantee that the target file is indeed stored in the storage system. The matched fingerprints can only indicate the possibility and/or probability of the matched files. There is a chance that different files may have the same fingerprints. Thus, matching the fingerprints can only identify file candidates that may potentially match the target file. The actual file candidates have to be compared with the actual target file to determine which of the file candidates exactly matches the target file. Therefore, the entire search process includes at least two stages: 1) identifying candidates based on the matched fingerprints; and 2) matching the candidates with the target. Note that some or all of the components as shown in FIGS. 1-2 may be implemented in software, hardware, or a combination of both.

Figure 3:
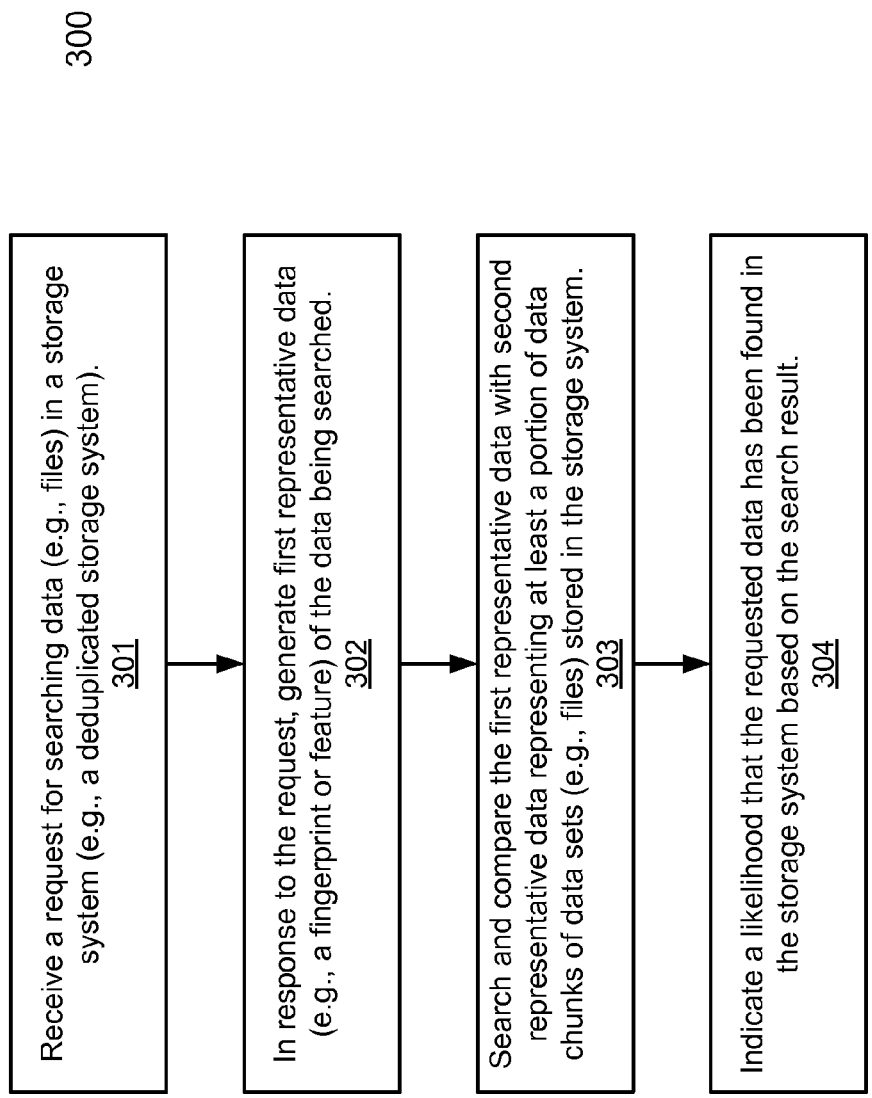
FIG. 3 is a flow diagram illustrating a method for search files in a storage system based on representative data according to one embodiment of the invention.

FIG. 3 is a flow diagram illustrating a method for search files in a storage system based on representative data according to one embodiment of the invention. For example, method 300 may be performed by storage system 104 of FIG. 1. Referring to FIG. 3, at block 301, a request is received for searching a file stored in a storage system, such as a deduplicated storage system. At block 302, in response to the request, first representative data is generated for the file being searched (e.g., target file). In generating the first representative data, a variety of data filtering techniques may be utilized to exclude certain bits (e.g., least significant bits) of the data to further improve the accuracy of the comparison. For example, the first representative data may be generated using only a subset of bits of the data (e.g., most significant bits). The first representative data may be fingerprints of the target file, features extracted from the target file, or a combination of both. In one embodiment, the target file is partitioned into multiple chunks and representative data is generated from each of the chunks. If the storage system is a deduplicated system, the target file is partitioned using the same partition method and the fingerprints are generated using the same fingerprint generation method of the deduplicated storage system.

At block 303, processing logic searches and compares the first representative data with second representative data representing at least a portion of data chunks of files stored in the storage system. In one embodiment, the second representative data was previously generated and stored in the storage system when the corresponding data chunks were stored in the storage system. Similarly, the second representative data may include fingerprints, features, or a combination of both. The matched fingerprints may be utilized to identify one or more file candidates that may potentially matches the target file. At block 304, processing logic indicates a likelihood that the target file is stored in the storage system based on the search result. In addition, the storage locations of the file candidates may be flagged or recorded, such that the actual file content of the target file and file candidates can be compared to confirm whether the target file is indeed found from the file candidates.

According to some embodiments, the techniques described above can be applied to searching any file stored in the storage system that contains certain content, which is represented by target representative data such as fingerprints or features. Embodiments of the invention as described above can be utilized by enterprise entities or companies to identify unwanted information such as confidential information that should not be on a given storage system. The companies can also identify illicit content that is against a corporate policy or misuses corporate resources. The companies can also identify backup files even if the backup catalog is corrupted. The companies can utilize the techniques described above to identify and/or remove such unwanted information.

Figure 4A:
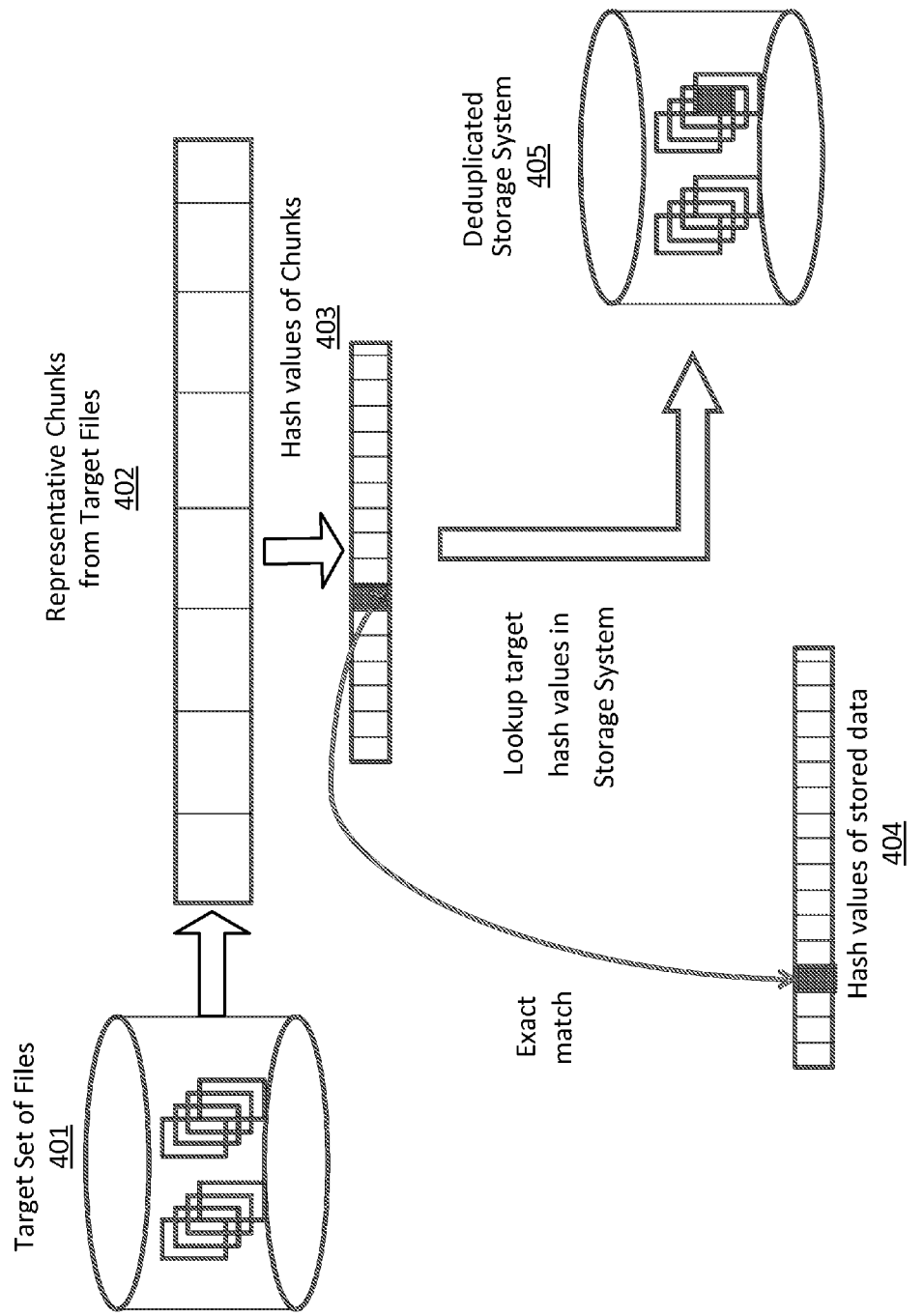
FIGS. 4A and 4B are diagrams illustrating processes for identifying files containing certain content according to some embodiments of the invention.
Figure 4B:
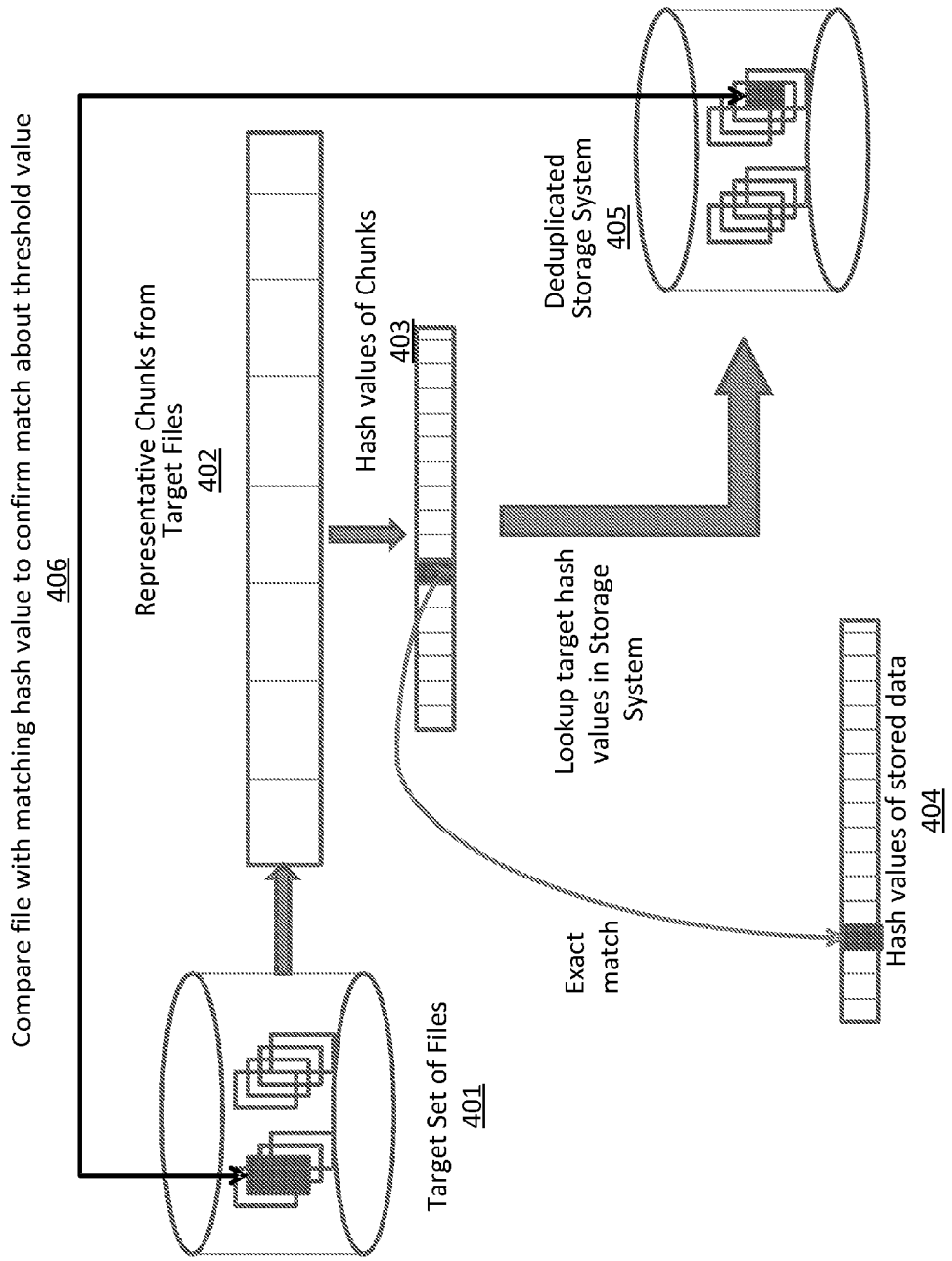

FIGS. 4A and 4B are diagrams illustrating processes for identifying files containing certain content according to some embodiments of the invention. Referring to FIG. 4A, initially, a set of target files 401 is identified by a client (e.g., administrator or a policy maker of an enterprise entity). These are the files the enterprise entity wants to detect the existence of within deduplicated storage system 405. Deduplicated storage system 405 stores data in content-defined chunks and each chunk has a unique hash value (e.g., fingerprint) associated with it. The target files 401, which will be tested for existence, are partitioned into chunks 402 using the same content-defined chunking algorithm and the same hash function as is used by the deduplicated storage of deduplicated storage system 405, generating hash values 403. Examples of chunking algorithms include Rabin anchoring and examples of hashing algorithms include SHA-1 and MD5.

All or a sampled sub-set of the chunk hash values 403 from the target files are entered into a data-structure such as an index or bloom-filter (not shown). This target set of hash values 403 is compared against the hash values 404 existing in the deduplicating file system. If N hash values are sampled per target file and M hash values from the deduplicated store match, then this will be flagged as a probable match (e.g. M of N could be 1 of 2 or 3 of 5 etc). The comparison can be done at any of a number of times such as when new files are written, when system cleaning is performed or as a separate process. Matches within the system against the target set of files can be flagged and the locations of the files within the storage system noted. Flagged files can be delta encoded against the target file to identify similar files and eliminate false positives, via path 406 as shown in FIG. 4B. Matched files and their locations can be reported to the user for information or corrective action.

Figure 5:
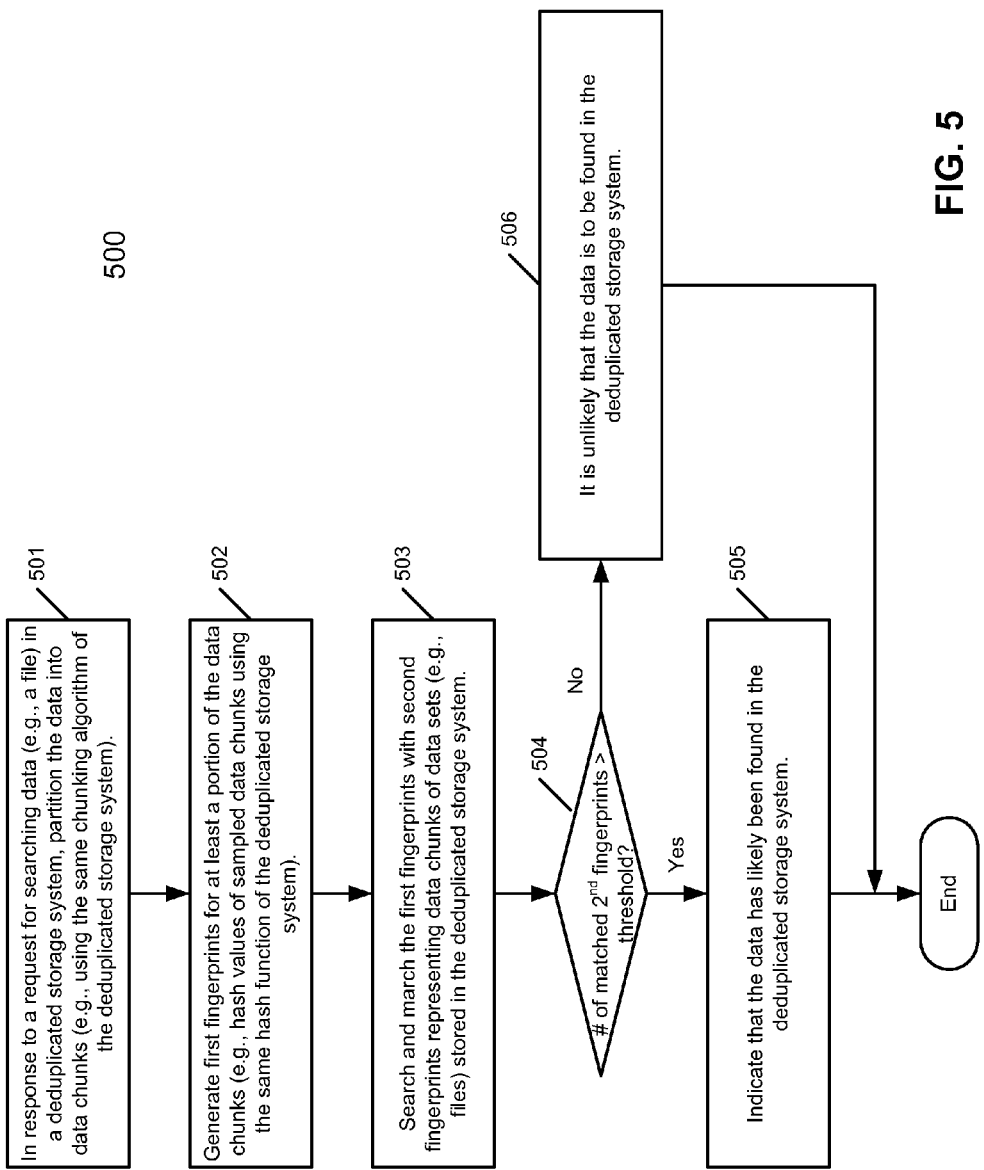
FIG. 5 is a flow diagram illustrating a method for search files containing certain content based on representative data according to another embodiment of the invention.

FIG. 5 is a flow diagram illustrating a method for search files containing certain content based on representative data according to another embodiment of the invention. Referring to FIG. 5, in response to a request for searching a file in a deduplicated storage system, at block 501, the target file is partitioned into data chunks. In one embodiment, the target file is partitioned using the same partition method that is used to partition files into deduplicated data chunks to be stored in the storage system. At block 502, first fingerprints are generated for at least a portion of data chunks of the target file. For example, the first fingerprints are generated using the same fingerprint generation method (e.g., hash algorithms such as SHA-1 or MD5) that is used to generate fingerprints for the deduplicated data chunks stored in the storage system. At block 503, processing logic searches and compares the first fingerprints against second fingerprints of data chunks stored in the storage system. At block 504, it is determined whether the number of second fingerprints that match any of the first fingerprints exceeds a predetermined threshold. If so, at block 505, processing logic indicates there is likelihood that the target file is stored in the storage system; otherwise, at block 506, processing logic indicates that it is unlikely the target file can be found in the storage system.

Again note that the matched fingerprints can only indicate the likelihood of a file to be found in the storage system. The actual content of the files has to be matched in order to determine whether the file is indeed stored in the storage system. However, for a large scale storage system, by matching fingerprints, candidates of the matched files can be quickly identified. The actual content matching can be performed on a much smaller set of candidates, instead of matching the entire files as used in a conventional system.

Figure 6:
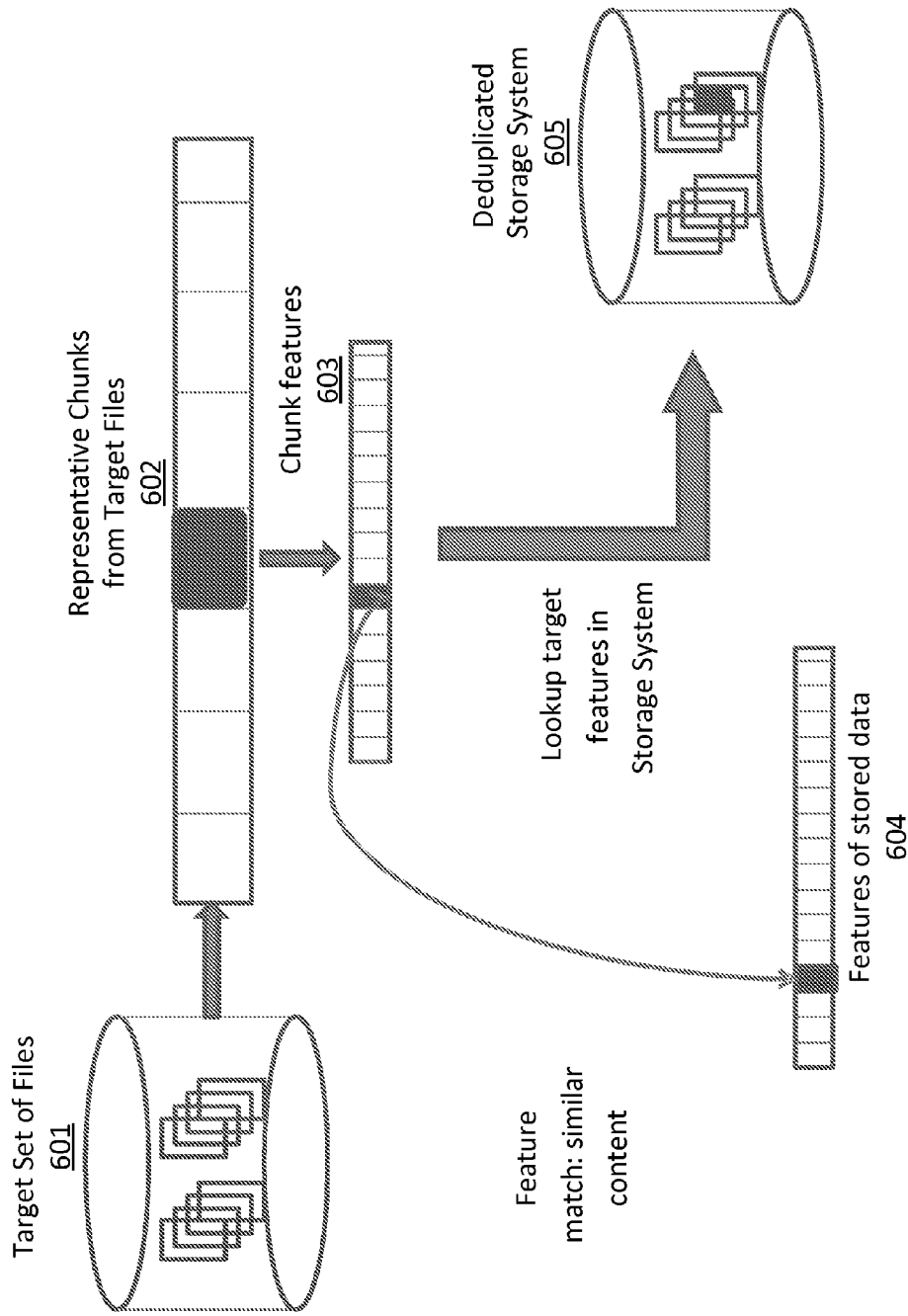
FIG. 6 is a diagram illustrating processes for identifying files containing certain content according to another embodiment of the invention.

As described above, fingerprints of data chunks are utilized to identify candidates of matched files for the purpose of searching a target file. However, according to some embodiments, other signatures of data chunks may also be utilized. For example, instead of using fingerprints, one or more features of data chunks can be utilized to identify the candidates. FIG. 6 is a diagram illustrating processes for identifying files containing certain content according to another embodiment of the invention. Referring to FIG. 6, initially, a set of target files 601 is identified by a client (e.g., administrator or a policy maker of an enterprise entity). These are the files the enterprise entity wants to detect the existence of within deduplicated storage system 605. Deduplicated storage system 605 stores data in content-defined chunks and each chunk has at least one feature that is extracted from the corresponding data chunk. The target files 601, which will be tested for existence, are partitioned into chunks 602 using the same content-defined chunking algorithm and the same feature extraction method as is used by the deduplicated storage of deduplicated storage system 405, generating features 603.

In one embodiment, a Rabin Fingerprint is computed over a sliding window, similar to that used for chunking. The features for a chunk can be the N lowest value Rabin fingerprints computed when sliding over the chunk. But a good way to efficiently find similar chunks is to combine the Rabin fingerprints into a smaller number of features that, if matched, indicate a much higher probability. For the purpose of illustration, imagine that one of the sliding windows that produces a low value is a common string, so it appears a lot. But if four different Rabin hash functions are utilized and the lowest values from each of the four are combined, all four would have to appear in another chunk for them to match. Alternatively, features can be created by taking low or high-order bits from the data, masking sections of the data, or transforming the data with various computational functions. By transforming data prior to computing representative data, similar data have the same representative data and can be matched efficiently.

All or a sampled sub-set of the chunk features 603 from the target files are entered into a data-structure such as an index or Bloom filter (not shown). This target set of chunk features 603 is compared against the features 604 existing in the deduplicating file system. In one embodiment, if N features are sampled per target file and M features from the deduplicated store match, then this will be flagged as a probable match (e.g. M of N could be 1 of 2 or 3 of 5 etc). The comparison can be done at any of a number of times such as when new files are written, when system cleaning is performed or as a separate process. Matches within the system against the target set of files can be flagged and the locations of the files within the storage system noted. Flagged files can be delta encoded against the target file to identify similar files and eliminate false positives. Matched files and their locations can be reported to the user for information or corrective action.

Note that the techniques described above can also be applied to dynamic detection of data objects likely containing unwanted content. According to some embodiments, representative data (e.g., feature, fingerprint) can also be used to detect whether a data object or file contains certain unwanted content or data. In one embodiment, when a data object is received, prior to storing a data object in a storage system, representative data of the data object is obtained and compared with another representative data that represents certain unwanted content. Such a comparison is performed without having to scan or access the actual data object. If the representative data of the data object matches at least a portion of the representative data of the unwanted content, there is a chance that the data object may contain at least some of the unwanted content. The processing logic can then decide whether the data object should be stored in the storage system. If it is determined that the data object is unlikely to contain the unwanted content based on the comparison (e.g., the representative data do not match), the actual data object is then received and stored in the storage system. Thus, only the representative data is used to detect whether a data object is likely to contain unwanted content without having to scan the actual data object. As a result, the efficiency of the detection is greatly improved. This is particularly helpful for a large scale data storage system that handles a huge amount of data from thousands of clients.

Figure 7:
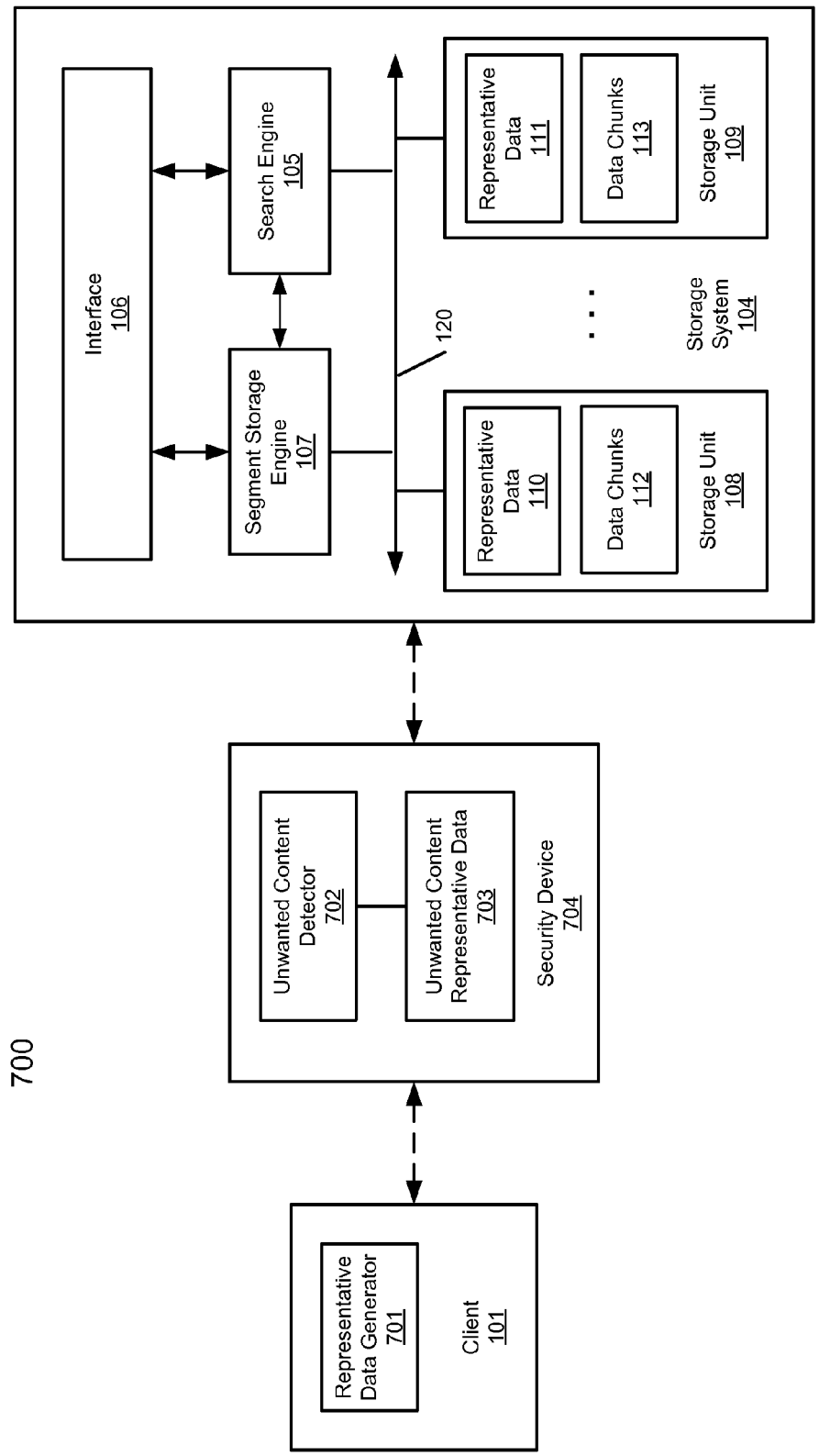
FIG. 7 is a block diagram illustrating a storage system according to another embodiment of the invention.

FIG. 7 is a block diagram illustrating a storage system according to another embodiment of the invention. System 700 may be implemented as a part of system 100 of FIG. 1. Referring to FIG. 7, in one embodiment, security device 704 is utilized to detect whether a data object, prior to being stored in storage system 104, may contain certain unwanted content based on representative data of the data object, without a need to access or scan the actual data object. A data object herein may represent a file or a data chunk of a file. Security device 704 may be implemented as a part of storage system 104, such as a frontend (e.g., a Web server, gateway device, antivirus protection system, firewall, etc.) of storage system 104. Alternatively, security device 704 may be implemented as part of client 101 such as a local antivirus system. Furthermore, security device 704 may be implemented as part of a separate entity such as a router or a media server.

In one embodiment, when client 101 wishes to store a data object to be stored in storage system 104, prior to sending the data object, representative data generator 701 is configured to generate first representative data from the data object using a predetermined algorithm or function. The data object may be an entire file or one of data chunks partitioned by client 101, where each data chunk may represent a deduplicated data chunk to be stored in one of storage units 108-109 of storage system 104. The first representative data may be generated by hashing at least a portion of the data object using a predetermined hash algorithm such as SHA-1 or MD5 algorithm. Alternatively, the first representative data may be generated by extracting one or more features from at least a portion of the data object using a predetermined feature extraction method, as described above.

According to one embodiment, client 101 then transmits the first representative data to security device 704 without sending the data object. In response, unwanted content detector 702 is configured to determine whether the data object is likely to contain unwanted content by comparing the first representative data against unwanted content representative data 703. This operation is performed without having to scan or access the actual data object. In one embodiment, unwanted content representative data 703 may be generated from the unwanted content using the same processing logic or algorithm or function for generating the first representative data.

Based on the detection, unwanted content detector 702 sends a response to client 101 indicating whether the data object is likely to contain unwanted content. If the first representative data matches a certain amount (e.g., above a predetermined threshold) of unwanted content representative data 703, it is likely that the data object contains the unwanted content; otherwise, it is unlikely the data object contains the unwanted content. If it is determined the data object is unlikely to contain the unwanted content, client 101 then transmits the actual data object to be stored in storage system 104. In addition, the first representative data may also be stored in storage system 104, where the first representative data may be utilized for searching purposes by search engine 105 as described above. Thus, by only comparing the representative data, which is relatively small in size compared to the actual data object, the system can quickly determine whether it is likely a particular data object contains a certain unwanted object. This is very important and helpful to a large scale storage system that handles a huge amount of data for thousands of clients.

According to one embodiment, the functionality of checking for unwanted content may be integrated as part of backup client software running within client 101 (e.g., as part of BOOST™ protocol from EMC®). When a file is to be backed up, fingerprints representing data chunks of the file are transferred from client 101 to security device 704. If the fingerprints are unique (e.g., non-duplicated data chunks), it will cause client 101 to transfer the corresponding data chunks to the storage system. In this example, first representative data is computed for non-duplicated chunks and the comparison to second representative data then takes place. This saves computation and time since duplicate chunks are already known to be wanted. That is, a duplicated data chunk (e.g., one that has already been stored in the storage system) is unlikely to contain unwanted content; otherwise, it could have been detected previously when it was stored in the storage system. Alternatively, one could check for unwanted content before filtering, as described above, if there is a possibility the storage system already has unwanted content for some reason.

Figure 8:
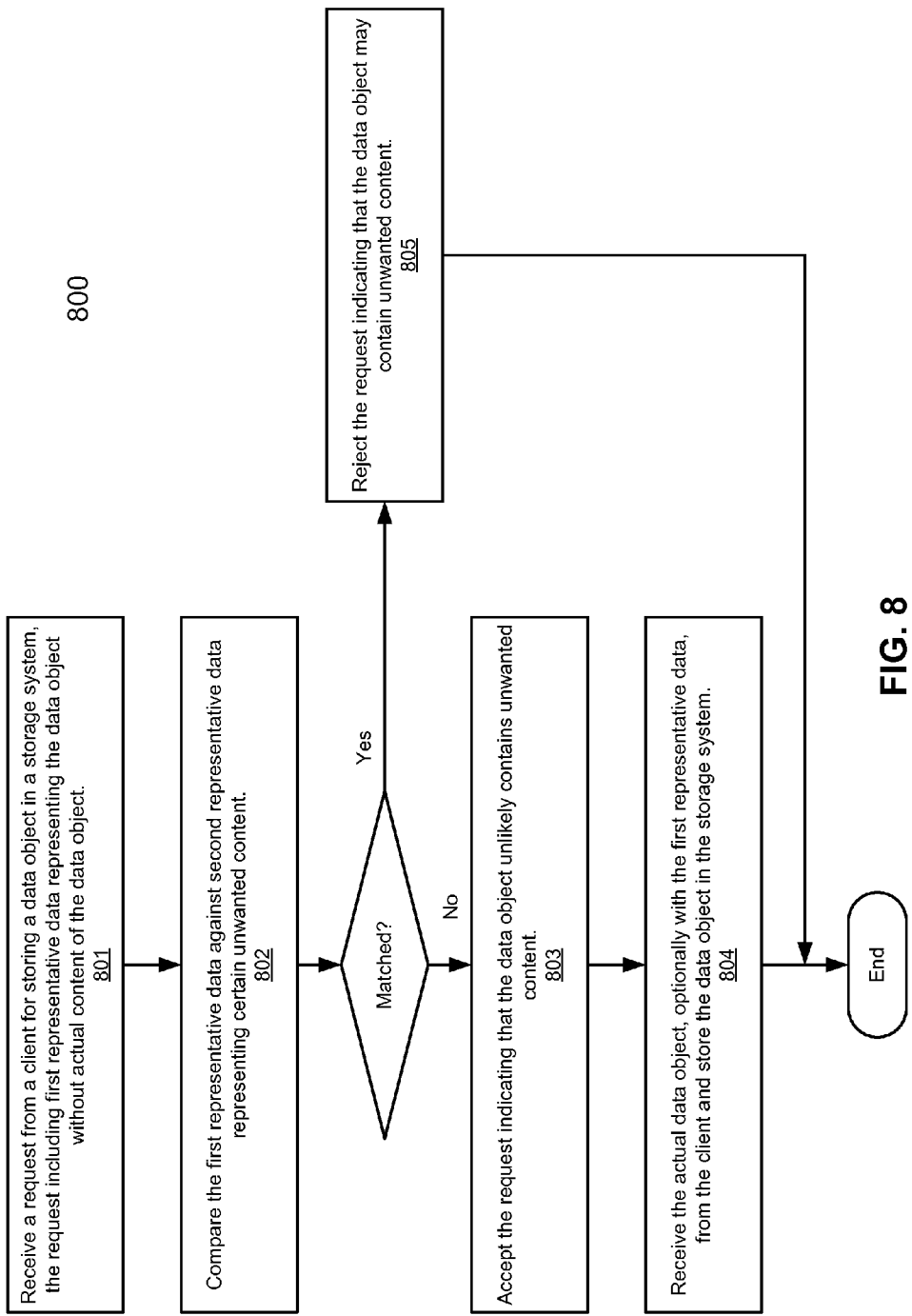
FIG. 8 is a flow diagram illustrating a method for detecting unwanted content in a file to be stored in a storage system based on representative data according to one embodiment of the invention.

FIG. 8 is a flow diagram illustrating a method for detecting unwanted content in a file to be stored in a storage system based on representative data according to one embodiment of the invention. Method 800 may be performed by security device 704 of FIG. 7. Referring to FIG. 8, at block 801, a request is received from a client for storing a data object (e.g., a data chunk or file) in a storage system (e.g., deduplicated storage system). The request includes first representative data representing the data object, but without the actual data object. In response to the request, at block 802, processing logic compares the first representative data against second representative data, where the second representative data represents certain characteristics of unwanted content. In one embodiment, the first and second representative data may be generated using the same processing logic (e.g., same feature extraction method or fingerprint generation algorithm). If the first representative data matches certain portions of the second representative data, at block 805, the request is rejected, indicating that the data object is likely to contain unwanted content. If the first representative data does not match or only match a portion that is below a predetermined threshold, at block 803, processing logic sends a response to the client accepting the request, indicating that the data object is unlikely to contain unwanted content. At block 806, the actual data object, optionally with the first representative data, is then received from the client and stored in the storage system.

Figure 9:
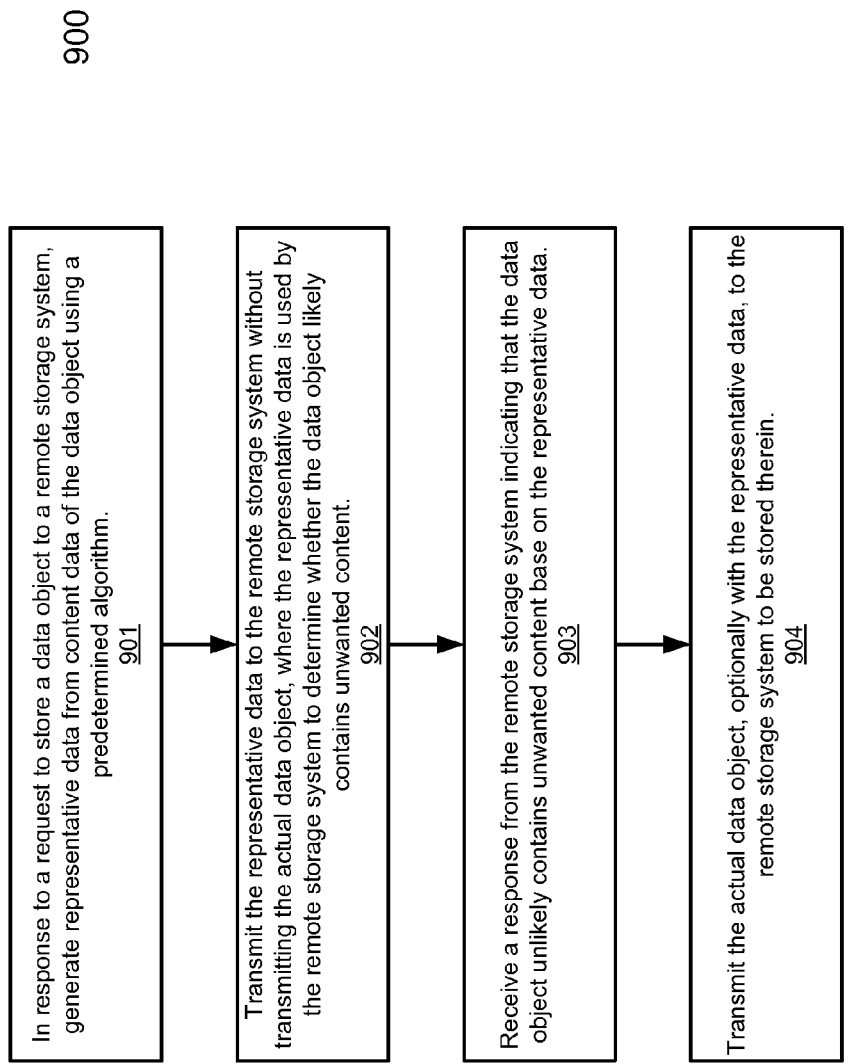
FIG. 9 is a flow diagram illustrating a method for detecting unwanted content in a file to be stored in a storage system based on representative data according to another embodiment of the invention.

FIG. 9 is a flow diagram illustrating a method for detecting unwanted content in a file to be stored in a storage system based on representative data according to another embodiment of the invention. Method 900 may be performed by client 101 of FIG. 7. Referring to FIG. 9, in response to a request to store a data object to a remote storage system, at block 901, processing logic generates representative data from the data object using a predetermined algorithm (e.g., feature extraction method or fingerprint generation algorithm). At block 902, the representative data is transmitted to a security system associated with the remote storage system without sending the actual data object. The representative data is used by the security system to determine whether the data object may contain unwanted content by matching the representative data against another representative data that represents certain characteristics of the unwanted content, as described above. At block 903, a response is received from the security system indicating that the data object is unlikely to contain the unwanted content based on the representative data. In response, at block 904, the actual data object, optionally with the representative data, is transmitted to the remote storage system to be stored therein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for detecting unwanted content, the method comprising:
receiving a request for storing a data object in a storage system from a client over a network, the data object comprising a plurality of chunks, each chunk represented by a representative data, the request including a first representative data representing a first chunk of the data object without including actual content of the data object;
determining whether the data object has been stored at the storage system prior to determining whether the data object is likely to contain unwanted content;
in response to determining the data object has not been stored at the storage system, determining whether the data object is likely to contain unwanted content by comparing the first representative data with a second representative data without accessing the actual content of the data object and without comparing all the representative data representing the plurality of chunks of the data object against the second representative, the second representative data representing the unwanted content that should not be stored in the storage system based on a policy configured by an administrator associated with the storage system;
in response to determining the data object has not been stored at the storage system and further in response to determining that the data object is likely to contain unwanted content, transmitting a first response to the client over the network informing the client that the data object is likely to contain the unwanted content based on comparison of the first and second representative data, wherein the first response causes the client not to send the data object;
in response to determining the data object has not been stored at the storage system and further in response to determining the data object is not likely to contain unwanted content, transmitting a second response to the client over the network informing the client that the data object is not likely to contain the unwanted content based on comparison of the first and second representative data, wherein the second response causes the client to send the data object;
receiving the actual data object from the client, wherein the actual data object is received only if the second response was sent to the client indicating that the data object is unlikely to contain the unwanted content; and
storing the data object in the storage system including the first representative data of the data object.

2. The method of claim 1, wherein the second representative data was generated based on one or more data objects that contain the unwanted content using an identical predetermined algorithm that was used to generate the first representative data.

3. The method of claim 1, wherein the first representative data is generated based on at least one of one or more features extracted from the data object and a fingerprint computed by hashing the data object.

4. The method of claim 1, wherein the first representative data was generated by the client using a predetermined function that was used to generate the second representative data.

5. The method of claim 1, wherein the storage system is a deduplicated storage system having a plurality of storage units, each of the storage units storing data that is deduplicated therein.

6. The method of claim 1, wherein the first representative data is generated by:
partitioning a file associated with the data object into a plurality of chunks; and
for each of the chunks, generating third representative data, wherein the first representative data is generated based on at least a portion of the third representative data.

7. The method of claim 6, wherein the third representative data is generated based on at least one of one or more features extracted from each of the chunks and a fingerprint computed by hashing each of the chunks.

8. The method of claim 7, wherein third representative data is generated by applying a data filtering technique using only a subset of bits of the data.

9. The method of claim 1, wherein indicating a likelihood that the data object contains unwanted content comprises:
   determining an amount of second representative data that matches the first representative data; and
   indicating that the data object is likely to contain the unwanted content if the amount of matched second representative data exceeds a predetermined threshold.

10. A non-transitory computer-readable storage medium having instructions stored therein, which when executed by a computer, cause the computer to perform operations comprising:
   receiving a request for storing a data object in a storage system from a client over a network, the data object comprising a plurality of chunks, each chunk represented by a representative data, the request including a first representative data representing a first chunk of the data object without including actual content of the data object;
   determining whether the data object has been stored at the storage system prior to determining whether the data object is likely to contain unwanted content;
   in response to determining the data object has not been stored at the storage system, determining whether the data object is likely to contain unwanted content by comparing the first representative data with a second representative data without accessing the actual content of the data object and without comparing all the representative data representing the plurality of chunks of the data object against the second representative, the second representative data representing the unwanted content that should not be stored in the storage system based on a policy configured by an administrator associated with the storage system;
   in response to determining the data object has not been stored at the storage system and further in response to determining that the data object is likely to contain unwanted content, transmitting a first response to the client over the network informing the client that the data object is likely to contain the unwanted content based on comparison of the first and second representative data, wherein the first response causes client not to send the data object;
   in response to determining the data object has not been stored at the storage system and further in response to determining the data object is not likely to contain unwanted content, transmitting a second response to the client over the network informing the client that the data object is not likely to contain the unwanted content based on comparison of the first and second representative data, wherein the second response causes the client to send the data object;
   receiving the actual data object from the client, wherein the actual data object is received only if the second response was sent to the client indicating that the data object is unlikely to contain the unwanted content; and
   storing the data object in the storage system including the first representative data of the data object.

11. The non-transitory computer-readable storage medium of claim 10, wherein the second representative data was generated based on one or more data objects that contain the unwanted content using an identical predetermined algorithm that was used to generate the first representative data.

12. The non-transitory computer-readable storage medium of claim 10, wherein the first representative data is generated based on at least one of one or more features extracted from the data object and a fingerprint computed by hashing the data object.

13. The non-transitory computer-readable storage medium of claim 10, wherein the storage system is a deduplicated storage system having a plurality of storage units, each of the storage units storing data that is deduplicated therein.

14. A system, comprising:
   a processor; and
   a memory coupled to the processor to store instructions, which when executed from the memory, cause the processor to
      receive a request for storing a data object in a storage system from a client over a network, the data object comprising a plurality of chunks, each chunk represented by a representative data, the request including a first representative data representing a first chunk of the data object without including actual content of the data object,
      determine whether the data object has been stored at the storage system prior to determining whether the data object is likely to contain unwanted content,
      in response to determining the data object has not been stored at the storage system, determine whether the data object is likely to contain unwanted content by comparing the first representative data with a second representative data without accessing the actual content of the data object and without comparing all the representative data representing the plurality of chunks of the data object against the second representative, the second representative data representing the unwanted content that should not be stored in the storage system based on a policy configured by an administrator associated with the storage system,
      in response to determining the data object has not been stored at the storage system and further in response to determining that the data object is likely to contain unwanted content, transmit a first response to the client over the network informing the client that the data object is likely to contain the unwanted content based on comparison of the first and second representative data, wherein the response causes the client not to send the data object,
   in response to determining the data object has not been stored at the storage system and further in response to determining the data object is not likely to contain unwanted content, transmit a second response to the client over the network informing the client that the data object is not likely to contain the unwanted content based on comparison of the first and second representative data, wherein the second response causes the client to send the data object, and
   wherein the actual data object is received from the client if the second response was sent to the client indicating that the data object is unlikely to contain the unwanted content and the data object is stored in the storage system including the first representative data of the data object.

15. The system of claim 14, wherein the second representative data was generated based on one or more data objects that contain the unwanted content using an identical predetermined algorithm that was used to generate the first representative data.

16. The system of claim 14, wherein the first representative data is generated based on at least one of one or more features extracted from the data object and a fingerprint computed by hashing the data object.

17. The system of claim 14, wherein the storage system is a deduplicated storage system having a plurality of storage units, each of the storage units storing data that is deduplicated therein.

* * * * *